UNITED STATES PATENT OFFICE.

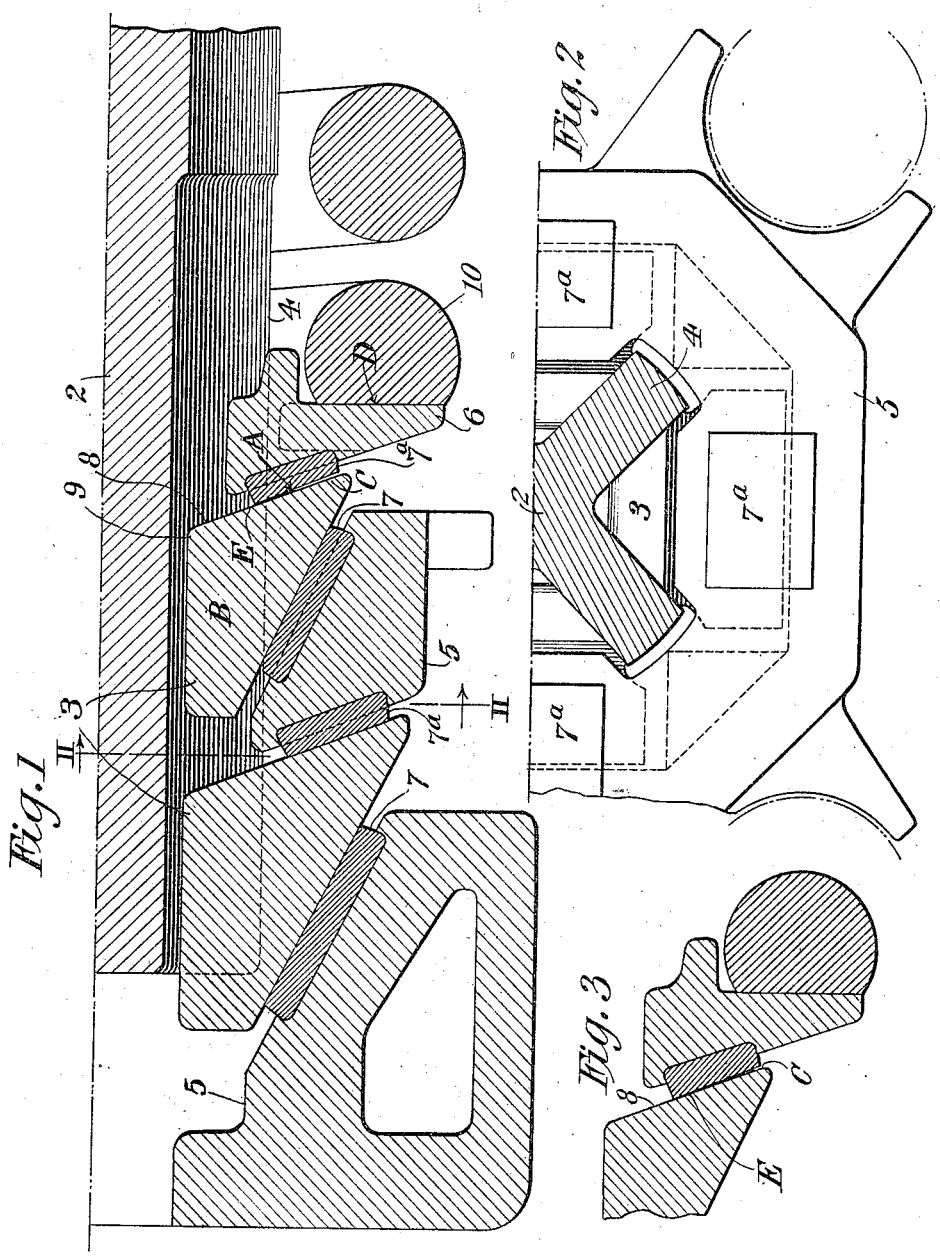

ERNEST H. SCHMIDT, OF LAKEWOOD, OHIO, ASSIGNOR TO THE NATIONAL MALLEABLE CASTINGS COMPANY, OF CLEVELAND, OHIO, A CORPORATION OF OHIO.

SHOCK-ABSORBING MECHANISM.

1,243,227.    Specification of Letters Patent.    Patented Oct. 16, 1917.

Application filed March 8, 1917. Serial No. 153,270.

*To all whom it may concern:*

Be it known that I, ERNEST H. SCHMIDT, a citizen of the United States, and a resident of Lakewood, Cuyahoga county, Ohio, have invented new and useful Improvements in Shock-Absorbing Mechanisms, of which the following is a specification, reference being had to the accompanying drawings, in which—

Figure 1 is a longitudinal section, partly in elevation, showing the application of my invention to a railway car draft rigging of the included friction member type; Fig. 2 is a section on lines II—II thereof, and Fig. 3 shows a detail of the rigging in compressed position.

My invention relates to shock absorbing mechanisms of the type shown in the co-pending application of Chester K. Brooks and Ernest H. Schmidt, Serial No. 93,596, filed April 26, 1916, in which the frictional elements are comprised of a plurality of friction shoes arranged about a central friction member, and consists in shoes and pressure-transmitting members arranged so as to assist in the release of the shoes from their engagement with the central member at the end of the compressive movement of the gear. My invention also consists in the construction and coöperation of the parts which I shall hereinafter describe and claim.

Referring to the drawings, in which I have shown my invention applied to a shock absorbing mechanism of the included friction member type, 2 indicates the central friction element having friction shoes or members 3 arranged between the arms 4 thereof and held against the friction faces of such arms by means of wedges 5 and a follower 6, which encircle the friction element 2. Soft metal inserts or pads 7, 7ª, made of brass or similar metal, are provided, which are secured in the wedges 5 and follower 6 and bear on the friction shoes 3. These pads 7, 7ª assist in preventing the wedges and shoes from sticking together when the rigging is relieved from pressures of buffing and draft.

To assist in causing the shoes to properly release from their compressive engagement with the central member 2, I have shown the rear faces 8 of the shoes inclined rearwardly from the central member, and the co-acting faces of the pads 7ª are inclined in a corresponding direction.

In the operation of the gear it will be seen that when the pressure abates the follower 6 and rearmost wedge 5 tend to force the shoes away from the central member by reason of the rearward inclination of the rear faces of the shoes. It will also be seen that the releasing pressure is applied to the shoes at the point A, and that, as this is at a distance outside of the point B, which is the center of frictional area of the shoes and likewise the center of resistance to release, the releasing pressure exerted by the wedges has therefore a tendency to tip the shoes or pry them away from the friction surfaces of the central member; that is, there is a tendency to tip the heel 9 of each shoe up and away from the central member during release, which, of course, assists in a more speedy and effective release than if the releasing force were applied in a direction parallel with or approximately in line with the friction faces of the central member 2.

I have also observed that while the gear is under compression the pads 7ª, particularly on the follower 6, bear almost squarely upon the rear surfaces 8 of the shoes of the rear set somewhat, as is shown in Fig. 3, but that when the compression abates a gap appears at C between the rear faces of the shoes and the edge of the pad farthest from the central member, as is shown in Fig. 1. This tilting or rocking action of the follower 6 upon the shoes is due to the fact that the pressure of the compression spring 10 is exerted upon the follower at D, and this pressure is in turn carried to the shoes at A, which is considerably offset from the point B. This off-centered application, as the pressure abates, causes the follower 6 to spring slightly, so as to leave a small gap at C, or, in other words, to concentrate the releasing pressure at the point E, or at a point of contact between the follower 6 and rearmost shoe 3 which is off-centered from the point of resistance B. As the wedge 6 thus exerts upon the shoes 3 a maximum tipping or twisting pressure, this, in addition to the effect of the rearward inclination of the rear faces of the shoes, results in a very positive release of the shoes.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In frictional shock absorbing mechanism, a longitudinally-extending friction element, friction shoes arranged about said friction element and in frictional engagement therewith, each friction shoe having two wedging faces, and wedge members encircling the included friction element, each wedge having a wedging face engaging a wedging face of a friction shoe, the wedging face of one wedge being adapted to force the shoes against the friction element during compression of the gear, and the wedging face on another of the wedges being adapted to tilt the shoes away from the compression member after the pressure abates.

2. In frictional shock absorbing mechanism, a longitudinally-extending friction element, friction shoes arranged about said friction element and in frictional engagement therewith, members encircling the included friction element and engaging said shoes, and a compression spring engaging one of said members, each of said shoes having its front and rear faces inclined from its friction face toward the spring, and engaging correspondingly-inclined faces upon the said members, the member next the spring having a tilting action on the shoes during release, whereby the release of the shoes from the friction element is accelerated.

3. In frictional shock absorbing mechanism, a longitudinally-extending friction element, friction shoes arranged about the frictional element and in frictional engagement therewith, two wedge members engaging each friction shoe, and a compression spring engaging a wedge member, the wedge members and friction shoes having coöperating engaging faces inclined from the friction element toward the spring, during compression the spring and a wedge member holding the shoes in position to be compressed by another wedge member against the friction element, and during release the spring tilting a wedge member and the wedge member tilting the shoes respectively by an off-centered application of force, to effect a release of the shoes from their friction grip on the friction element.

ERNEST H. SCHMIDT.